Sept. 3, 1929.   W. SKOWRON   1,726,772
RIP SAW
Filed Nov. 18, 1925   2 Sheets-Sheet 1

Inventor
Walter Skowron
By Bradbury & Cawell
Attorneys

Sept. 3, 1929.  W. SKOWRON  1,726,772
RIP SAW
Filed Nov. 18, 1925   2 Sheets-Sheet 2

Inventor

Walter Skowron

By Bradbury & Cawell
Attorneys

Patented Sept. 3, 1929.

1,726,772

UNITED STATES PATENT OFFICE.

WALTER SKOWRON, OF MINNEAPOLIS, MINNESOTA, ASSIGNOR OF ONE-HALF TO JOHN WYCHOR, OF MINNEAPOLIS, MINNESOTA.

RIPSAW.

Application filed November 18, 1925. Serial No. 69,789.

My invention relates to rip saws and has for its object to provide a saw frame adapted to be adjustably attached to a beam or other timber upon which the saw is to operate to hold the same in proper position relative thereto.

Another feature of the invention resides in providing said frame with rails and a carriage movable along the same and to mount upon said carriage a reciprocating saw blade adapted to cut the beam or timber upon which the device is mounted.

A still further object of the invention resides in providing a depending handle and bevel gears operated thereby for reciprocating said saw while in its cutting position.

Other objects of the invention reside in the detailed construction thereof as disclosed in the following description, claims and drawing.

In the drawing illustrating my invention in one form:

Figure 1:
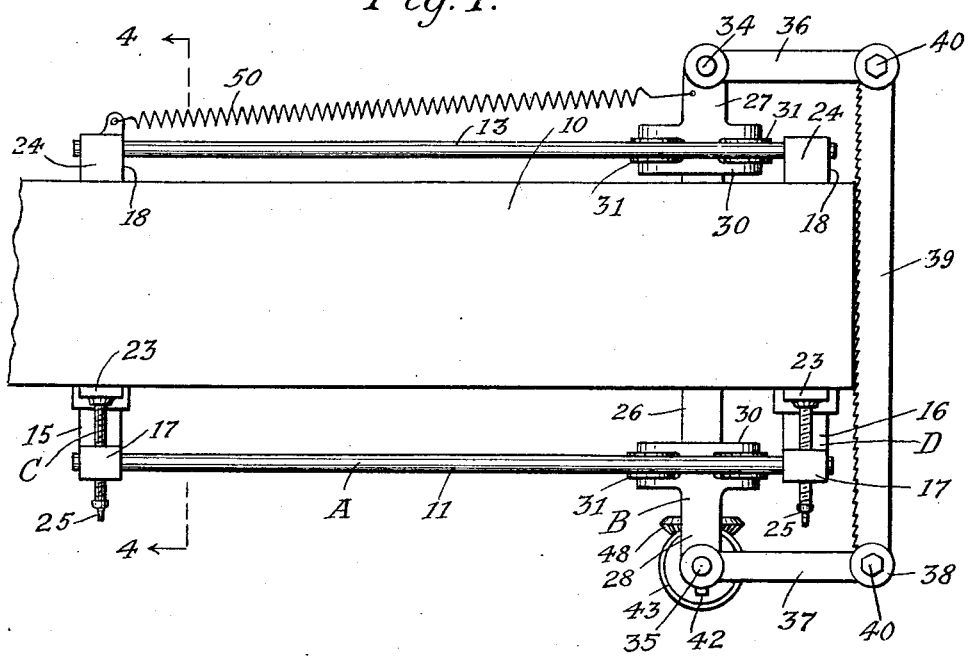
Fig. 1 is a plan view of my improved rip saw showing the same mounted on a beam.

In the repairing of the beams or stringers for railway cars which have become rotted or broken, it frequently becomes necessary to cut out sections of the beams and splice new sections to them by lapping the ends thereof and bolting the same together. To accomplish this result it is necessary to cut the beam and the new section longitudinally along the centers for the length of the splice so that when the ends are bolted together the beam will have the same general dimensions as originally. Due to the fact that in ordinary car construction the beams are quite close together it becomes impossible to manipulate the ordinary hand saw in so ripping the beam, thereby making the splicing difficult and expensive. My invention overcomes these difficulties by providing a frame adapted to be attached to the beam having saw operating means extending below the beam proper where it may be readily manipulated.

My rip saw is shown in conjunction with a beam 10 which may be a beam or stringer of a railway car or which may be any other timber or beam structure upon which it is desired to operate the saw. When the saw is used with railway car beams the same is manipulated from below as said beams are usually covered with flooring and inaccessible from above.

The device comprises a frame A which is adapted to be clamped upon the beam 10 and which carries a carriage B on which the saw proper is mounted. The frame A consists of four rods 11, 12, 13 and 14 which are disposed in pairs on either side of the beam 10 and serve as rails on which the carriage B is movable. These rails are connected together by means of two U-shaped members 15 and 16 having upstanding portions 17 and 18 in which said rails are secured and a transverse portion 19 connecting the same. The rails 11, 12, 13 and 14 may be pinned to the upstanding portions 17 and 18 of members 15 and 16 by means of pins 20 so as to provide a substantial and rigid framework for the device.

Figure 4:
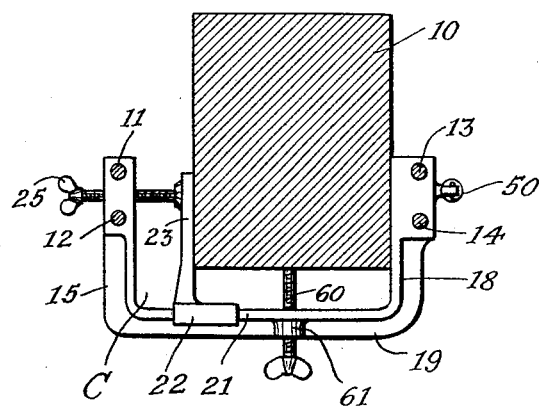
Fig. 4 is a sectional view taken on line 4—4 of Fig. 2.

The frame A is clamped to the beam 10 by means of two clamps C and D formed in conjunction with the members 15 and 16 of which clamp C is shown in detail in Fig. 4. As will be noted the upstanding portions 17 and 18 of the members 15 and 16 are sufficiently spaced to permit of attachment to the largest beam upon which it is desired to operate the saw. Upon a flange 21 formed on the transverse portion 19 is slidably positioned a rider 22 having an upwardly extending portion 23 forming the movable jaw of the clamp structure. The upstanding portion 18 of member 15 is similarly constructed to portions 23 and 24 to provide the fixed jaw member of said clamp structure. A screw 25 threaded in the upstanding portion 17 engages the jaw 23 and serves to advance it along the flange 21 to bring it into engagement with the beam 10 so as to rigidly clamp the frame A upon the beam with its rails 11, 12, 13 and 14 extending longitudinally thereof.

For determining the proper position of frame A upon the beam 10 I provide two gauge screws 60 which are threaded into bosses 61 formed in the portions 19 of members 15 and 16. By properly adjusting these screws the relative position of the frame A and beam 10 may be determined so that the frame may be moved along said beam with the saw blade remaining parallel to the surface of said beam and the same distance therefrom.

The carriage B as previously stated is movably mounted upon the frame A. This structure comprises a U-shaped T beam 26 formed with upstanding portions 27 and 28 connected by a transverse portion 29. At the top of the upstanding portions 27 and 28 are arranged forked cross bars 30 which are positioned between the rails 11 and 12, and 13 and 14 respectively. Between the forked portions of the bars 30 are pivoted grooved wheels 31 which are of such a diameter as to just fit between the rails 11 and 12 or 13 and 14 as the case may be. By means of these wheels 31 the carriage B is movably mounted in longitudinal relation to the frame A. It will be noted that wheels 31 are arranged in pairs so that the carriage B cannot tilt and must hence travel in upright position.

Figure 2:
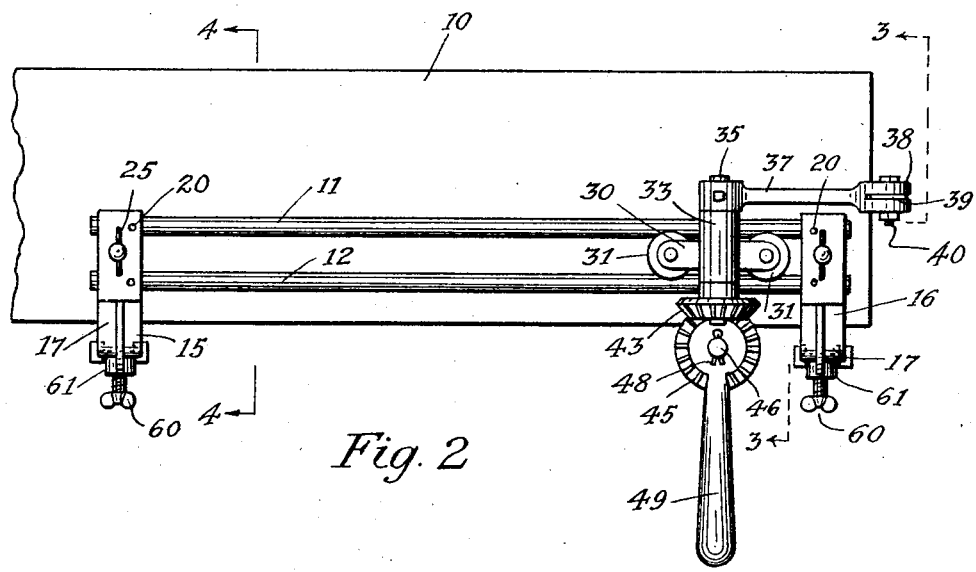
Fig. 2 is an elevational view of the structure shown in Fig. 1.
Figure 3:
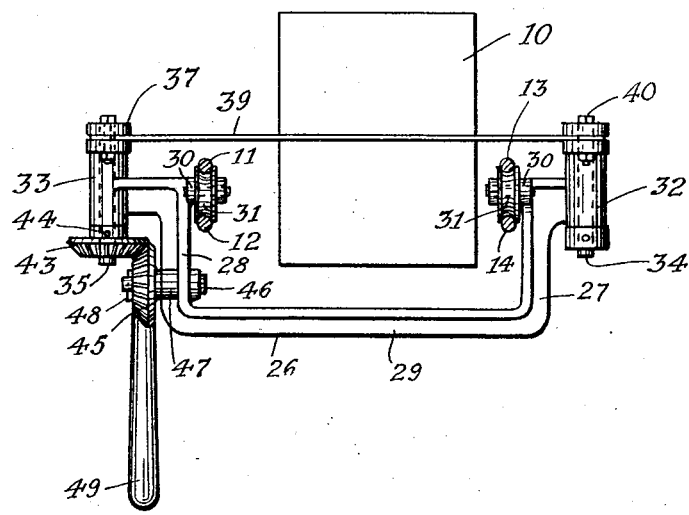
Fig. 3 is a sectional view taken on line 3—3 of Fig. 2.

The carriage B supports the saw together with the actuating mechanism therefor. The construction thereof is shown in Figs. 1, 2 and 3. Upon the upper ends of the upstanding portions 27 and 28 of the beam 26 are formed two vertical bearings 32 and 33 which rise above the rails 11 and 13 and in which are journaled shafts 34 and 35. These shafts have secured to the upper ends thereof by means of pins 42, two arms 36 and 37 which are positioned in longitudinal relation to the beam 10 extending rearwardly thereof and which are provided with forked ends 38. A saw blade 39 of suitable length is mounted between the forked ends 38 of arms 36 and 37 and is held in place therein by means of bolts 40 which pass directly through the same and allow the saw to pivot in relation to said arms. Upon oscillating the arms 36 and 37 the saw 39 is caused to reciprocate in a manner to cut the timber 10 lengthwise as required.

For operating the saw 39 the following construction is used. At the lower end of shaft 35 is mounted a bevel gear 43 which is secured to it by means of a pin 44. This gear meshes with another bevel gear 45 rotatably mounted on a stub shaft 46 which is secured in a boss 47 formed on the upstanding portion 28 of beam 26. A cotter pin 48 passing through the end of shaft 46 holds the gear 45 in place. Depending from the gear 45 I provide a handle 49 which may be integrally connected therewith as shown or which may be attached to it in any other suitable manner. By oscillating this handle the gear 45 causes the shaft 35 to rock through the action of gear 43, which causes the arm 37 to oscillate and the saw 39 to reciprocate as required. A tension coil spring 50 (Fig. 1), secured at one end to carriage B and at its other end to the member 15 serves to advance the carriage B longitudinally along the frame A.

In using the device, spring 50 is first disconnected and carriage B moved to its extreme outer position. The frame A is then firmly attached to the beam 10 or other timber upon which the saw is to operate by means of the clamps C and D so that the saw 39, when carriage B is in its extreme position lies just outside of the end of the timber. The rails 11 and 13 are arranged so that the same lie parallel to the line along which it is desired to rip the beam, saw 39 being properly positioned to begin the cut. Gauge screws 60 are then screwed up until they engage the beam 10. Spring 50 is next replaced and the operation of sawing carried out by oscillating the handle 49 forth and back causing the saw to reciprocate in the usual manner. It will be noted that upon exerting pressure on the handle 49 in the direction of clamp C the blade 39 is moved through its cutting stroke while at the same time pressure is exerted through lever 49 upon carriage B causing the same to bring the saw blade 39 in cutting contact with the timber to be sawed. Upon exerting pressure on said handle in the opposite direction the blade 39 is moved through its return stroke and carriage B is moved in the opposite direction freeing the saw blade 39 from engagement with the timber during its return movement. In this manner effective and efficient operation of the saw is possible. When it is desired to extend the cut further than permitted by the frame A the said frame is advanced along the timber 10 and again clamped thereon in the proper position to permit of continuing the operation, the gauge screws 60 serving to determine the correct distance of the saw from the bottom of the beam.

Although the device has been described as used for the purpose of splicing beams or stringers of railway cars it is evident that it may be used for many other purposes such as cutting down floor joists in residences to permit of installing tile floors, recessing studs in buildings to form reveals, and in general for any kind of ripping where the ordinary hand saw cannot be used.

My improved rip saw is highly advantageous in that it forms a guide for supporting the saw to cause it to cut in any desired direction so that a true cut may be secured along any predetermined plane. A short saw blade may be used permitting the device to operate in cramped or confined places where the manipulation of the ordinary hand saw would be impossible. By having the operating handle swing in a plane at right angles to the plane of the saw blade, the ease and facility with which the device may be manipulated is greatly increased at the same time making the device more adaptable for use in awkward positions.

Having described my invention in the form which I consider the best embodiment thereof, I desire to have it understood that the invention may be made in different ways and put to uses other than those disclosed within the scope of the following claims:

1. A saw comprising a frame having pairs of horizontal rails, a carriage movable along said rails, spaced vertical bearings formed on said carriage, shafts journaled in said bearings and extending upwardly above said rails, arms secured to said shafts, a saw blade pivoted to said arms and extending across said frame, said blade being parallel to the plane of said rails and means for reciprocating said saw blade.

2. A saw comprising a frame including a pair of rails, a carriage comprising an underslung U-shaped frame formed with upstanding portions, forked cross-bars formed at the upper portions of said underslung frame, wheels rotatably mounted in said forked cross-bars, said wheels being adapted to ride along said rails, bearings formed in said upstanding portions positioned outwardly from said cross-bars, shafts journaled in said bearings extending above said rails, arms secured to said shafts, a saw pivoted to said arms and means for reciprocating said saw.

3. A saw comprising a support, a pair of spaced parallel bearings formed on said support, shafts journaled in said bearings, parallel arms attached to said shafts, a saw blade pivoted to said arms, a bevel gear on one of said shafts, a stub shaft secured to said support at right angles to said shaft, a bevel gear journaled on said stub shaft and meshing with said other bevel gear and a handle secured to said second bevel gear for oscillating said shaft to reciprocate said saw.

4. A saw structure for attachment to a timber to be cut comprising a pair of spaced U-shaped frame members having upstanding portions, pairs of rails secured to said upstanding portions, clamps formed on said frame members for positioning the saw structure upon the timber to be cut, a saw carriage having a U-shaped frame formed with upstanding portions, wheels rotatably mounted in said upstanding portions and riding upon said rails, bearings formed on said upstanding portions of said carriage frame, shafts rotatable in said bearings, arms secured to said shafts, a saw blade pivoted to said arms and extending across said frame, a bevel gear formed on one of said shafts, a second bevel gear meshing with said first bevel gear and a lever for oscillating said second bevel gear to reciprocate said saw.

5. A saw comprising a frame, having a guideway, clamps formed on said frame at the extreme ends thereof for attaching said frame to the end of a timber upon which the saw is to operate, a carriage movable along said guideway, arms pivoted to said carriage and extending outwardly therefrom beyond said frame when said carriage is in one of its extreme positions, a saw pivoted to said arms and means for reciprocating said saw.

In testimony whereof, I have signed my name to this specification.

WALTER SKOWRON.